J. H. STARR.
HAT NAP RAISING MACHINE.
APPLICATION FILED MAY 31, 1911.
1,014,419.
Patented Jan. 9, 1912.
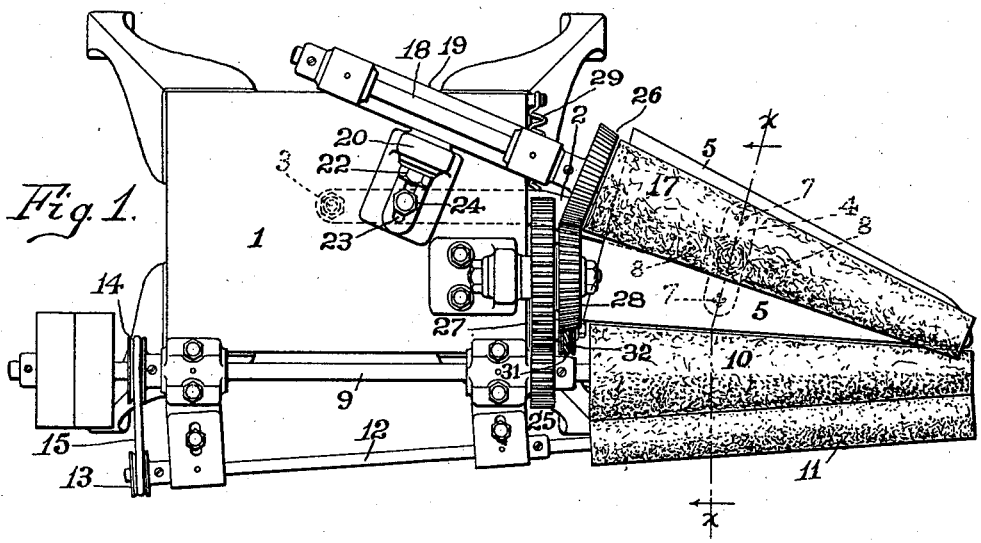
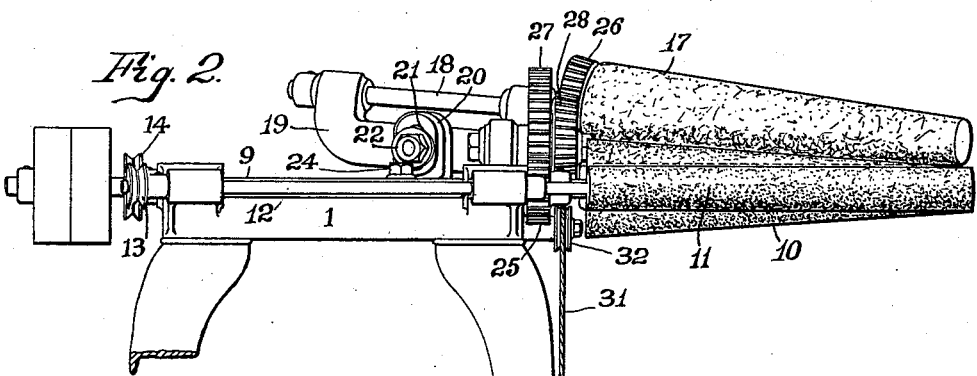
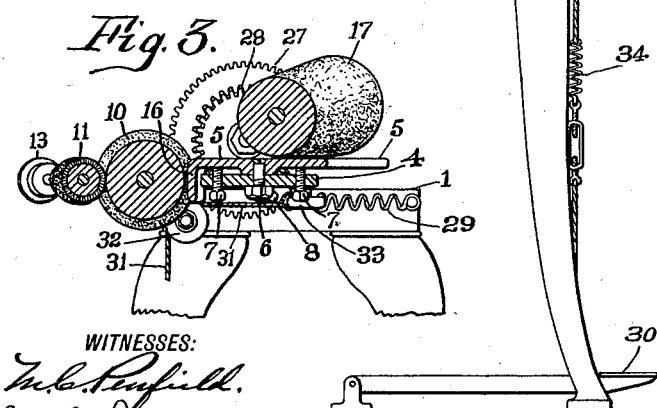
WITNESSES:
INVENTOR
John H. Starr.
BY 
ATTORNEY

UNITED STATES PATENT OFFICE.

JOHN H. STARR, OF DANBURY, CONNECTICUT, ASSIGNOR TO E. A. MALLORY & SONS, OF DANBURY, CONNECTICUT, A CORPORATION OF CONNECTICUT.

HAT-NAP-RAISING MACHINE.

1,014,419.  Specification of Letters Patent.  Patented Jan. 9, 1912.

Application filed May 31, 1911. Serial No. 630,355.

*To all whom it may concern:*

Be it known that I, JOHN H. STARR, a citizen of the United States, residing in the city of Danbury, county of Fairfield, State of Connecticut, have invented certain new and useful Improvements in Hat-Nap-Raising Machines; and I do declare the following to be a full, clear, and exact description of the invention, such as will enable others skilled in the art to which it appertains to make and use the same.

My invention relates to certain new and useful improvements in hat nap raising machines, and has for its object to provide a machine of this description which shall possess efficiency, can be readily operated and which shall obviate the necessity of the employment of a conical shaped support closely conforming to a hat placed thereon, and with these ends in view my invention consists in certain details of construction and combination of parts such as will be hereinafter fully described and then particularly pointed out in the claims which conclude this description.

In the accompanying drawing Figure 1 is a plan view of my improved machine—Fig. 2 a side elevation thereof, and Fig. 3 a section at the line x, x, of Fig. 1.

Similar numerals of reference denote like parts in the several figures of the drawing.

1 is the bed of the machine and 2 is a bar pivoted at 3 (shown in dotted lines) to the underside of said bed, said bar having an angularly disposed portion which extends beyond the bed and terminates in a cross head 4. 5 is the hat support which is of a general triangular shape and is secured to said cross head 4 by means of a center bolt 6. 7 are adjusting bolts extending through the end portions of the cross head and impinging against the under surface of the support 5, and by relaxing the center bolt 6 these adjusting bolts 7 may be manipulated in an obvious manner to tilt the support 5 transversely which of course would cause the upper surface of said support to assume a position at an angle to a horizontal plane. I likewise provide adjusting bolts 8 which extend through the bar 2 at locations at right angles to the bolts 7, and by manipulating these bolts 8 in an obvious manner the support 5 may be tilted lengthwise. In the drawing one of the bolts 8 appears at Fig. 3 in the immediate rear of the bolt 6, and at Fig. 1 these bolts appear in dotted lines, but any detailed illustration of said bolts is deemed unnecessary for the reason that they perform a function similar to that performed by the bolt 7 which is merely to provide for adjustments of the support 5 that may or may not be desired.

9 is the power shaft which carries at its extremities beyond the bed of the machine a tapered napping roll 10 which latter is surfaced with any suitable material such as wire cloth. Adjacent to this roll is a cleaner roll 11 carried by a spindle 12 journaled in adjustable boxes on the bed of the machine and carrying a pulley 13 which receives motion from a pulley 14 on the power shaft by a connecting belt 15. The edge of the support 5 has adjacent to the roll 10 a flange 16, and said roll and flange in operative relations are closely conformed to each other so that a hat around said support will be uniformly embraced between said roll and flange for the purpose presently to be explained.

17 is a second tapered napping roll surfaced as in the instance of the roll already described, and extending at an angle to the first named roll and closely conforming in operative relation with a portion of the hat support 5 remote from said flange. This roll 17 is carried by a shaft 18 journaled in a bracket 19 that is pivotally swung from an upright 20 that is secured to the bed 1. This upright is provided with a vertically disposed elongated slot 21 through which a bolt extends loosely from the bracket 19 the free end of said bolt being engaged by a nut 22 so that it will be clear that said bracket may be swung or elevated in a vertical plane and secured in this position by tightening the nut, the roll 17 of course partaking of these adjustments which may be desired in order to bring the roll in proper relation with respect to the hat on the support.

Adjustments of the roll 17 in a horizontal plane are effected by providing for sliding or swinging movements of the upright 20 itself and to this end an elongated slot 23 is provided in the base portion of this upright through which slot a bolt extends a nut 24 engaging the free end of this bolt so that it will be readily understood that by relaxing this nut the upright may be swung in a horizontal plane or may be shifted bodily throughout the confines of the slot 23. Of course it will be clear that by swinging this upright in a horizontal plane or by shifting the same in the manner above described, corresponding movements will be imparted to the roll 17, and therefore it will be clear that this roll may be adjusted both in vertical and horizontal planes whenever the occasion demands.

25 is a small pinion carried by the shaft 9, and 26 is a bevel gear carried by the shaft 18.

27 is a spur gear in mesh with the pinion 25, and 28 is a bevel gear in mesh with the bevel gear 26, these gears 27, 28, being mere idle gears whereby motion is communicated from the power shaft to the shaft 18, and the nature of the gearing is such that the roll 10 will revolve twice as fast as the roll 17, although this proportion between these two rolls may be varied if desired.

29 is a coil spring whose extremities are secured respectively to the bed 1 and to the bar 2, the function of this spring being to normally withdraw the support 5 from its proximity to the rolls 10 and 17.

30 is a treadle which is connected to the bar 2 by means of a flexible connection 31, such as a rope, which is passed over an idle pulley 32 supported by the bed of the machine and thence connected with said bar. The connections of said rope and spring with this bar may be effected in any ordinary manner and in the present instance I have illustrated a small lug 33 which depends from said bar, to which lug said spring and rope are secured. Interposed at any suitable location within the length of this rope is a coil spring 34, so that it will be readily understood that when the treadle is depressed the support 5 will be drawn inwardly toward the rolls with more or less resilient action so that said support will thereby be yielding.

The normal position of the support 5 is, as has been heretofore explained, brought about by the action of the coil spring 29 which withdraws the support from a proximate relation with respect to the rolls, and while the support is in this position the operator places a hat thereover and then depresses the treadle whereby the support is brought into operative position with respect to said rolls with the hat lying smooth against the upper face of said support and depending in sagging condition below said support. As the rolls revolve in the same direction, the napping roll 10 will draw the hat over the flanged edge of the support, this movement of the hat being resisted by the comparatively slow rotating roll 17, and this action of the rolls against the hat will raise the nap thereof in a most expeditious and efficient manner, and all loose fibers or other foreign substance will be constantly removed from the roll 10 by means of the cleaner roll 11.

The process of removing a hat from the support and placing thereon subsequent hats is exceedingly simple since the hat does not closely conform to the support.

Having thus described my invention what I claim as new and desire to secure by Letters Patent is:—

1. A hat nap raising machine, comprising a flat stationary support for a hat, and a pair of nap raising rolls adapted to contact with the hat, said rolls being revolved in the same direction but at different speeds, whereby the hat will sag and will be dragged across the face of said support against the slower speeded roll.

2. A machine of the character described, comprising a flat stationary triangular shaped support for the hat, spaced rolls angularly disposed in close relation with said support whereby a hat will hang loosely on the latter but will be confined thereagainst by said rolls at different locations, and means for revolving said rolls in the same direction and at different speeds, whereby the hat will be dragged across the face of said support and against the slower speeded roll.

3. A machine of the character described, combining spaced rolls, a stationary triangular shaped support for the hat, a spring for normally separating said support from the rolls, and a treadle and flexible connection with said support for keeping the latter in contact with said rolls.

4. A machine of the character described, comprising a stationary support for the hat, spaced tapered napping rolls having close contact throughout their lengths with a hat on said support when said rolls and support are in operative positions, means for revolving said rolls in the same directon but at different speeds, and a cleaner roll operating against the surface of the higher speeded napping roll.

5. A machine of the character described, comprising a pair of spaced napping rolls, means for revolving said rolls in the same direction but at different speeds, and a support for the hat stationary as to rotation and capable of being swung into and out of operative position with respect to said rolls.

6. A machine of the character described, comprising a flat stationary tapered support for the hat whereby the latter will sag below said support, a pair of angularly disposed tapered napping rolls conformably adapted to said support, means for revolving said rolls in the same direction but at different speeds to drag the hat continuously across the upper face of said support and against the surface of the lower speeded roll.

7. A machine of the character described, comprising a stationary tapered flat support for the hat having a flange at one edge, a comparatively high speeded napping roll in proximity to said flange, and a comparatively low speeded napping roll in proximity to a remote part of said support.

8. A machine of the character described, comprising a triangular shaped flat support for the hat stationary as to rotation and pivotally swung from the bed of the machine and having a flange at one edge, a pair of different speeded tapered napping rolls the faster of which conforms to said flange while the other roll conforms to a remote portion of said support, and means for resiliently swinging said support into and out of operative position with respect to said rolls.

In testimony whereof I affix my signature in presence of two witnesses.

JOHN H. STARR.

Witnesses:
  F. W. SMITH, Jr.,
  M. T. LONGDEN.

---

Copies of this patent may be obtained for five cents each, by addressing the "Commissioner of Patents, Washington, D. C."